US006201974B1

(12) United States Patent
Lietsalmi et al.

(10) Patent No.: US 6,201,974 B1
(45) Date of Patent: Mar. 13, 2001

(54) MOBILE STATION AND NETWORK HAVING HIERARCHICAL INDEX FOR CELL BROADCAST SERVICE

(75) Inventors: Mikko Lietsalmi, Oulu (FI); Jaakko Vanttila, Bedford, TX (US); Seppo Alanara, Tokyo (JP)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/915,052

(22) Filed: Aug. 20, 1997

Related U.S. Application Data

(60) Provisional application No. 60/025,594, filed on Sep. 6, 1996.

(51) Int. Cl.[7] ..................... H04Q 7/22

(52) U.S. Cl. ..................... 455/466; 455/426; 455/422; 455/434; 455/515; 370/337

(58) Field of Search ..................... 455/422, 426, 455/434, 466, 515, 38.1, 38.3, 45; 370/336, 337, 347

(56) References Cited

U.S. PATENT DOCUMENTS 4,845,491 7/1989 Fascenda et al. ............... 340/825.44
5,398,021 3/1995 Moore ............... 340/825.27
5,404,355 4/1995 Raith ............... 370/95.1
5,481,254 1/1996 Gaskill et al. ............... 340/825.52
5,604,921 2/1997 Alanara ............... 455/45
5,655,215 * 8/1997 Diachina et al. ............... 455/466 X
5,692,032 11/1997 Seppanen et al. ............... 379/59
5,909,651 * 6/1999 Chandler et al. ............... 455/466

* cited by examiner

*Primary Examiner*—Fan Tsang
*Assistant Examiner*—Philip J. Sobutka
(74) *Attorney, Agent, or Firm*—Ohlandt, Greeley, Ruggiero & Perle, LLP

(57) ABSTRACT

This invention provides for the use of an index message in a Cell Broadcast Service. An index message is considered to be a special type of Cell Broadcast message which contains general information about actual broadcast messages. The index message is transmitted in a predetermined logical S-BCCH subchannel, and contains information elements such as (a) message overviews or summaries for each cell broadcast message, (b) information concerning emergency messages, (c) information concerning the language used in different broadcast messages, (d) an alphanumeric broadcast domain operator name and a specific operator greeting, (e) information concerning changes in broadcast messages, and (f) information concerning subchannels.

23 Claims, 20 Drawing Sheets

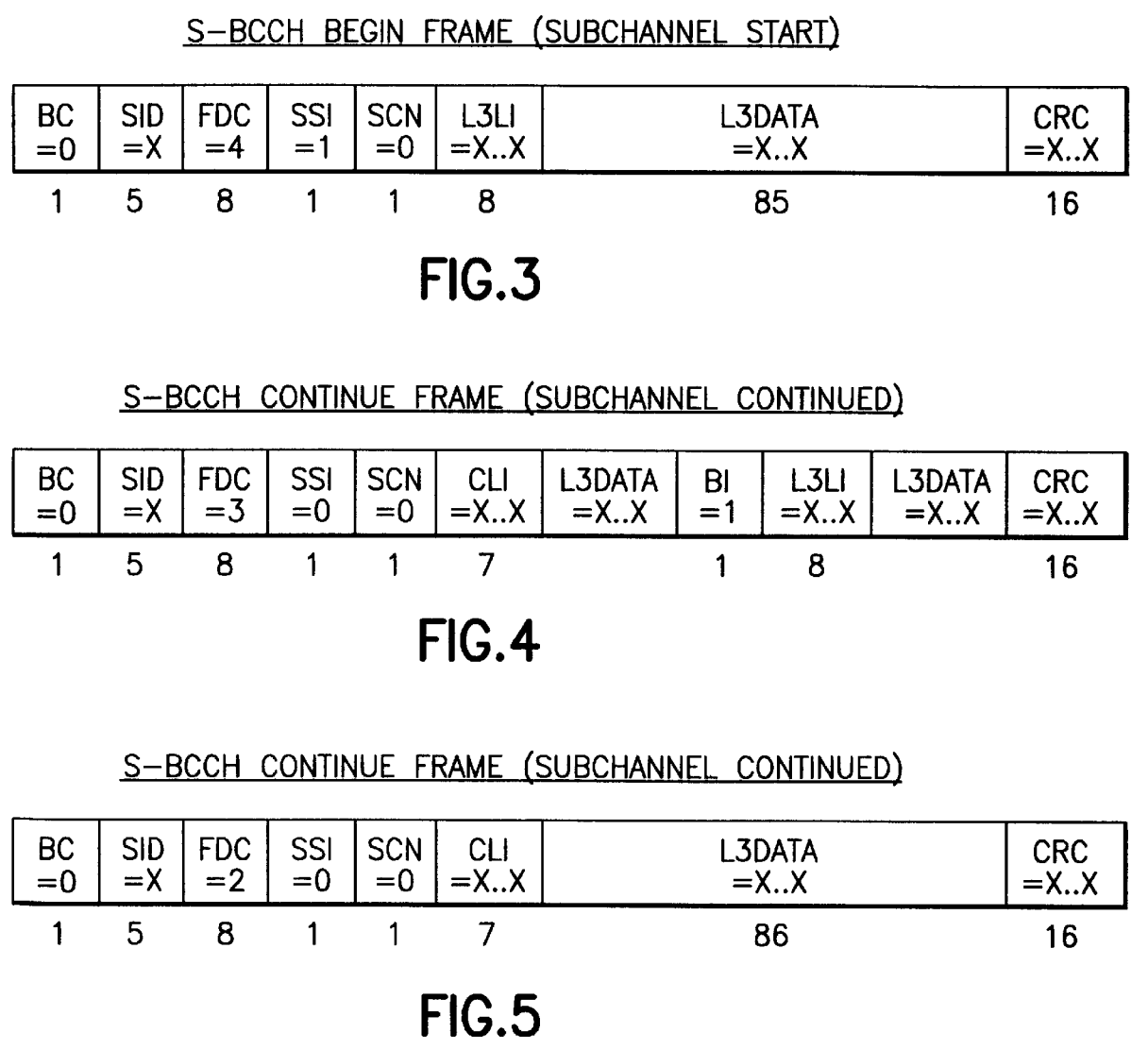

S-BCCH BEGIN FRAME (SUBCHANNEL START)

| BC =0 | SID =X | FDC =4 | SSI =1 | SCN =0 | L3LI =X..X | L3DATA =X..X | CRC =X..X |
|---|---|---|---|---|---|---|---|
| 1 | 5 | 8 | 1 | 1 | 8 | 85 | 16 |

FIG.3

S-BCCH CONTINUE FRAME (SUBCHANNEL CONTINUED)

| BC =0 | SID =X | FDC =3 | SSI =0 | SCN =0 | CLI =X..X | L3DATA =X..X | BI =1 | L3LI =X..X | L3DATA =X..X | CRC =X..X |
|---|---|---|---|---|---|---|---|---|---|---|
| 1 | 5 | 8 | 1 | 1 | 7 | | 1 | 8 | | 16 |

FIG.4

S-BCCH CONTINUE FRAME (SUBCHANNEL CONTINUED)

| BC =0 | SID =X | FDC =2 | SSI =0 | SCN =0 | CLI =X..X | L3DATA =X..X | CRC =X..X |
|---|---|---|---|---|---|---|---|
| 1 | 5 | 8 | 1 | 1 | 7 | 86 | 16 |

FIG.5

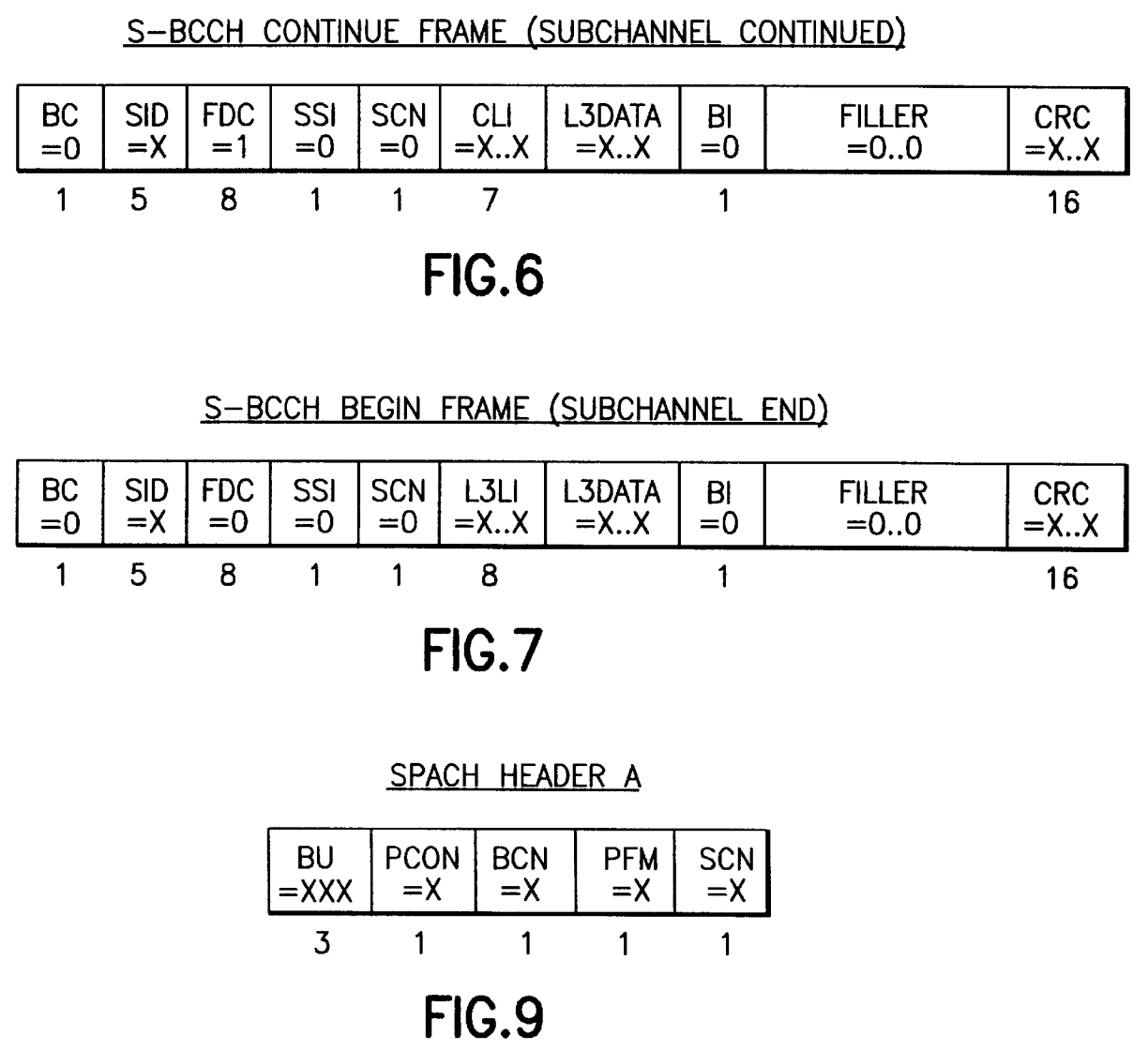

S-BCCH CONTINUE FRAME (SUBCHANNEL CONTINUED)

| BC =0 | SID =X | FDC =1 | SSI =0 | SCN =0 | CLI =X..X | L3DATA =X..X | BI =0 | FILLER =0..0 | CRC =X..X |
|---|---|---|---|---|---|---|---|---|---|
| 1 | 5 | 8 | 1 | 1 | 7 | | 1 | | 16 |

FIG.6

S-BCCH BEGIN FRAME (SUBCHANNEL END)

| BC =0 | SID =X | FDC =0 | SSI =0 | SCN =0 | L3LI =X..X | L3DATA =X..X | BI =0 | FILLER =0..0 | CRC =X..X |
|---|---|---|---|---|---|---|---|---|---|
| 1 | 5 | 8 | 1 | 1 | 8 | | 1 | | 16 |

FIG.7

SPACH HEADER A

| BU =XXX | PCON =X | BCN =X | PFM =X | SCN =X |
|---|---|---|---|---|
| 3 | 1 | 1 | 1 | 1 |

FIG.9

S-BCCH LAYER 2 PROTOCOL FIELD SUMMARY

| FIELD NAME | LENGTH (BITS) | VALUES |
| --- | --- | --- |
| BC=BEGIN/CONTINUE | 1 | IDENTIFIES THE TYPE OF L2 FRAME (0=BEGIN, 1=CONTINUE). |
| SID=SUBCHANNEL ID | 5 | UNIQUELY IDENTIFIES THE SUBCHANNEL THAT A L2 FRAME BELONGS TO (0...31). |
| FDC=FRAME DOWN COUNTER | 8 | UNIQUELY IDENTIFIES A L2 FRAME USED IN SENDING A FULL CYCLE OF SUBCHANNEL INFORMATION(0...255). |
| SSI=SUBCHANNEL START INDICATOR | 1 | INDICATES WHETHER OR NOT A L2 FRAME IS THE FIRST FRAME USED IN SENDING A CYCLE OF SUBCHANNEL INFORMATION (0=No, 1=YES) |
| SCN=S-BCCH CHANGE NOTIFICATION | 1 | TRANSITIONS WHETHER THERE IS A CHANGE IN THE CONTENT OF S-BCCH INFORMATION. A MOBILE STATION RESPONDS BY READING S-BCCH INFORMATION ON SUBCHANNEL 0. |
| CLI=CONTINUATION LENGTH INDICATOR | 7 | NUMBER OF BITS IN THE CURRENT L2 FRAME USED TO CARRY INFORMATION FROM A PREVIOUSLY INITIATED L3 MESSAGE |
| L3LI=LAYER 3 LENGTH INDICATOR | 8 | VARIABLE LENGTH LAYER 3 MESSAGES SUPPORTED FROM 0 UP TO A MAXIMUM OF 255 OCTETS. |
| L3DATA=LAYER 3 DATA | VARIABLE | CONTAINS A PORTION(SOME OR ALL) OF THE LAYER 3 MESSAGE HAVING AN OVERALL LENGTH AS INDICATED BY L3LI. THE PORTION OF THIS FIELD NOT USED TO CARRY LAYER 3 INFORMATION IS FILLED WITH ZEROS. |
| BI=BEGIN INDICATOR | 1 | 0=No ADDITIONAL L3 MESSAGE PRESENT 1=ADDITIONAL L3 MESSAGE PRESENT. |
| FILLER=BURST FILLER | VARIABLE | ALL FILLER BITS ARE SET TO ZERO. |
| CRC=CYCLE REDUNDANCY CODE | 16 | SEE SECTION 5.2.6 |

FIG.8

| INFORMATION ELEMENT | REFERENCE | TYPE | LENGTH |
|---|---|---|---|
| PROTOCOL DISCRIMINATOR | | M | 2 |
| MESSAGE TYPE | | M | 6 |
| R-DATA UNIT | | M | 16-* |
| LANGUAGE INDICATOR | | O | 8 |
| BROADCAST DOMAIN ID | | O | 12 |
| S-BCCH CHANGE INFORMATION | | O | 68 |
| S-BCCH EMERGENCY MESSAGE MAP | | O | 36 |

FIG.10

| INFORMATION ELEMENT | REFERENCE | TYPE | LENGTH |
|---|---|---|---|
| PROTOCOL DISCRIMINATOR | | M | 2 |
| MESSAGE TYPE | | M | 6 |
| SUBCHANNEL COUNT(N) | | M | 5 |
| SUBCHANNEL INFO | | O | 27-* |

FIG.11

| INFORMATION ELEMENT | REFERENCE | TYPE | LENGTH |
|---|---|---|---|
| PROTOCOL DISCRIMINATOR | | M | 2 |
| MESSAGE TYPE | | M | 6 |
| SUBCHANNEL ID | | M | 5 |

FIG.12

| INFORMATION ELEMENT | REFERENCE | TYPE | LENGTH |
|---|---|---|---|
| PROTOCOL DISCRIMINATOR | | M | 2 |
| MESSAGE TYPE | | M | 6 |
| NEXT SUBCHANNEL SCHEDULE 12* HYPERFRAMES CYCLE(N) | | M | 4 |
| SUBCHANNEL OCCURRENCE MAP | | M | 32 |

FIG.13

| INFORMATION ELEMENT | REFERENCE | TYPE | LENGTH |
|---|---|---|---|
| PROTOCOL DISCRIMINATOR | | M | 2 |
| MESSAGE TYPE | | M | 6 |
| R-DATA UNIT | 6.3.6 | M | 16-* |
| TELESERVICE SERVER ADDRESS | | O | 20-* |
| USER ORIGINATING ADDRESS | | O | 20-* |
| USER ORIGINATING SUBADDRESS | | O | 20-180 |
| USER ORIGINATING ADDRESS PRESENTATION INDICATOR | | O | 8 |

FIG.14

| S-BCCH MESSAGES | CODE (BINARY-DEC) |
| --- | --- |
| MESSAGE INDEX | 10 1101-45 |
| SUBCHANNEL CONFIGURATION | 10 1110-46 |
| SUBCHANNEL DELIMITER | 10 1111-47 |
| SUBCHANNEL SCHEDULE | 11 0000-48 |
| R-DATA | 01 1010-26 |

FIG.15

| FIELD | LENGTH |
| --- | --- |
| SUBCHANNEL ID | 5 |
| MEA | 3 |
| MEK | 3 |
| DATA COMPRESSION | 1 |
| STARTING MESSAGE # | 10 |
| LANGUAGE | 4 |
| BROADCAST MODE | 1 |
| USER GROUP TYPE | 0,2 |
| USER GROUP ID | 0,20,24,34 OR 50 |

FIG.16

| INFORMATION ELEMENT | TYPE | LENGTH |
|---|---|---|
| MESSAGE TYPE INDICATOR | M | 2 |
| TOTAL # OF MESSAGES | M | 10 |
| MESSAGES IN INDEX | M | 6 |
| INDEX MESSAGE COUNT | M | 6 |
| MESSAGE TYPE QUALIFIER (NOTE 1) | O | 16-* |
| MESSAGE SUMMARY (NOTE 1 AND NOTE 2) | O | 26-* |
| EMERGENCY MESSAGE SUMMARY (NOTE 1) | O | 18-* |
| OPERATOR NAME | O | 16-* |
| OPERATOR GREETING | O | 20-* |

FIG.17A

| PARAMETER TYPE | CODE |
|---|---|
| MESSAGE TYPE QUALIFIER | 1000 |
| MESSAGE SUMMARY | 1001 |
| EMERGENCY MESSAGE SUMMARY | 1010 |
| OPERATOR NAME | 1011 |
| OPERATOR GREETING | 1100 |

FIG.17B

| INFORMATION ELEMENT | TYPE | LENGTH |
|---|---|---|
| MESSAGE TYPE INDICATOR | M | 2 |
| MESSAGE REFERENCE | M | 13 |
| TOTAL # OF MESSAGES | M | 10 |
| MESSAGE # | M | 10 |
| MANUAL ACKNOWLEDGMENT REQUEST | M | 2 |
| RESERVED | M | 3 |
| USER DATA UNIT | M | 16-* |
| MESSAGE PROVIDER | O | 16-* |
| CALL BACK NUMBER (NOTE 1) | O | 20-* |
| CALL BACK NUMBER PRESENTATION INDICATOR (NOTE 2) | O | 8 |
| CALL BACK NUMBER ALPHA TAG (NOTE 2) | O | 16-* |

FIG.18A

| PARAMETER TYPE | CODE |
|---|---|
| MESSAGE PROVIDER | 1101 |
| CALL BACK NUMBER | 0100 |
| CALL BACK NUMBER PRESENTATION INDICATOR | 0101 |
| CALL BACK NUMBER ALPHA TAG | 0110 |

FIG.18B

| FIELD | LENGTH |
|---|---|
| PARAMETER TYPE | 4 |
| ADDRESS INFO | 16-* |

FIG.19

| FIELD | LENGTH |
|---|---|
| PARAMETER TYPE | 4 |
| LENGTH OF CALL BACK NUMBER ALPHA TAG IN OCTETS(N) (NOTE 1) | 4 |
| DISPLAY CHARACTER(IRA) (NOTE 2) | 8*N |

FIG.20

| FIELD | LENGTH |
|---|---|
| PARAMETER TYPE | 4 |
| PRESENTATION INDICATOR | 2 |
| SCREENING INDICATOR | 2 |

FIG.21A

| CODE | FUNCTION |
| --- | --- |
| 00 | PRESENTATION ALLOWED |
| 01 | PRESENTATION RESTRICTED |
| 10 | NUMBER NOT AVAILABLE |
| 11 | RESERVED |

FIG.21B

| CODE | FUNCTION |
| --- | --- |
| 00 | USER–PROVIDED, NOT SCREENED (NOTE 1) |
| 01 | USER–PROVIDED, VERIFIED AND PASSED |
| 10 | USER–PROVIDED, VERIFIED AND FAILED |
| 11 | NETWORK–PROVIDED |

FIG.21C

| FIELD | LENGTH |
| --- | --- |
| PARAMETER TYPE | 4 |
| MESSAGE # | 10 |
| LENGTH OF EMERGENCY MESSAGE SUMMARY DATA IN OCTETS(N) (NOTE 1) | 4 |
| EMERGENCY MESSAGE SUMMARY DATA(IRA) (NOTE 2) | 8*N |

FIG.22A

| VALUE | FUNCTION |
|---|---|
| 00 0000 0000 | NO LINK TO SMS DELIVER MESSAGE. |
| 00 0000 0001 | THE FIRST SMS DELIVER MESSAGE. |
| . . . | . . . |
| 11 1111 1111 | THE 1023rd SMS DELIVER MESSAGE. |

FIG.22B

| VALUE | FUNCTION |
|---|---|
| 00 0001 | THE FIRST SMS INDEX MESSAGE. |
| . . . | . . . |
| 11 1111 | THE 63rd SMS INDEX MESSAGE. |
| ALL OTHER VALUES ARE RESERVED | |

FIG.23

| VALUE | FUNCTION |
|---|---|
| 00 | MANUAL ACKNOWLEDGMENT PROHIBITED (NOTE 1) |
| 01 | MANUAL ACKNOWLEDGMENT REQUESTED (NOTE 2) |
| 10 | MANUAL ACKNOWLEDGMENT PROVIDED (NOTE 3) |
| ALL OTHER VALUES ARE RESERVED | |

FIG.24

| VALUE | FUNCTION |
|---|---|
| 00 0000 0001 | THE FIRST SMS DELIVER MESSAGE. |
| . . . | . . . |
| 11 1111 1111 | THE 1023rd SMS DELIVER MESSAGE. |
| ALL OTHER VALUES ARE RESERVED | |

FIG.25

| FIELD | LENGTH |
|---|---|
| PARAMETER TYPE | 4 |
| LENGTH OF MESSAGE PROVIDER DATA IN OCTETS(N) (NOTE 1) | 4 |
| DISPLAY CHARACTER(IRA) (NOTE 2) | 8*N |

FIG.26

| VALUE | FUNCTION |
|---|---|
| 00 0001 | ONE SMS INDEX MESSAGE. |
| . . . | . . . |
| 11 1111 | 63 SMS INDEX MESSAGES. |
| ALL OTHER VALUES ARE RESERVED | |

FIG.27

| FIELD | LENGTH |
|---|---|
| PARAMETER TYPE | 4 |
| MESSAGE TYPE QUALIFIER ID | 8 |
| MESSAGE # | 10 |
| LENGTH OF MESSAGE SUMMARY DATA IN OCTETS(N) (NOTE 1) | 4 |
| MESSAGE SUMMARY DATA(IRA) (NOTE2) | 8*N |

FIG.28A

| VALUE | FUNCTION |
|---|---|
| 0000 0000 | THE FIRST MESSAGE TYPE QUALIFIER ID. |
| 0000 0001 | THE SECOND MESSAGE TYPE QUALIFIER ID. |
| . . . | . . . |
| 1111 1111 | THE 256th MESSAGE TYPE QUALIFIER ID. |

FIG.28B

| VALUE | FUNCTION |
|---|---|
| 00 0000 0000 | NO LINK TO SMS DELIVER MESSAGE. |
| 00 0000 0001 | THE FIRST SMS DELIVER MESSAGE. |
| . . . | . . . |
| 11 1111 1111 | THE 1023rd SMS DELIVER MESSAGE. |

FIG.28C

| VALUE | FUNCTION |
|---|---|
| 00 | SMS DELIVER |
| 01 | SMS INDEX |
| ALL OTHER VALUES ARE RESERVED | |

FIG.29

| FIELD | LENGTH |
|---|---|
| PARAMETER TYPE | 4 |
| MESSAGE TYPE QUALIFIER ID | 8 |
| LENGTH OF MESSAGE TYPE QUALIFIER DATA IN OCTETS(N) (NOTE 1) | 4 |
| MESSAGE TYPE QUALIFIER DATA(IRA) (NOTE2) | 8*N |

FIG.30A

| VALUE | FUNCTION |
|---|---|
| 0000 0000 | THE FIRST MESSAGE TYPE QUALIFIER ID. |
| 0000 0001 | THE SECOND MESSAGE TYPE QUALIFIER ID. |
| . . . | . . . |
| 1111 1111 | THE 256th MESSAGE TYPE QUALIFIER ID. |

FIG.30B

| FIELD | LENGTH |
|---|---|
| PARAMETER TYPE | 4 |
| LENGTH OF OPERATOR GREETING DATA IN OCTETS(N) (NOTE 1) | 8 |
| OPERATOR GREETING DATA(IRA) (NOTE 2) | 8*N |

FIG.31

| FIELD | LENGTH |
|---|---|
| PARAMETER TYPE | 4 |
| LENGTH OF OPERATOR NAME DATA IN OCTETS(N) (NOTE 1) | 8 |
| OPERATOR NAME DATA(IRA) (NOTE 2) | 8*N |

FIG.32

| VALUE | FUNCTION |
|---|---|
| 00 0000 0001 | ONE SMS DELIVER MESSAGE. |
| . . . | . . . |
| 11 1111 1111 | 1023rd SMS DELIVER MESSAGES. |
| ALL OTHER VALUES ARE RESERVED | |

FIG.33

| FIELD | LENGTH |
|---|---|
| LENGTH INDICATOR (IN OCTETS) (N) | 8 |
| ENCODING IDENTIFIER | 5 |
| RESERVED | 3 |
| USER DATA | (N−1)*8 |

FIG.34A

| VALUE | FUNCTION |
|---|---|
| 00001 | IRA, AS SPECIFIED BY TABLES 5 AND A−1 OF ITU RECOMMENDATION T.50 (1992) |
| 00010 | USER SPECIFIC |
| ALL OTHER VALUES ARE RESERVED | |

FIG.34B

| SMS INDEX | SMS DELIVER | SMS DELIVER | SMS DELIVER | SMS DELIVER | SMS INDEX |
|---|---|---|---|---|---|
| TOT. # OF MSGS =4, MSGS IN INDEX=1, INDEX MSG COUNT=1 | TOT. # OF MSGS =4, MESSAGE # = 1 | TOT. # OF MSGS =4, MESSAGE # = 2 | TOT. # OF MSGS =4, MESSAGE # = 3 | TOT. # OF MSGS =4, MESSAGE # = 4 | |

FIG.35A

| SMS DELIVER | SMS DELIVER | SMS DELIVER | SMS DELIVER | SMS DELIVER | SMS DELIVER |
|---|---|---|---|---|---|
| TOT. # OF MSGS =4, MESSAGE # = 1 | TOT. # OF MSGS =4, MESSAGE # = 2 | TOT. # OF MSGS =4, MESSAGE # = 3 | TOT. # OF MSGS =4, MESSAGE # = 4 | TOT. # OF MSGS =4, MESSAGE # = 1 | |

FIG.35B

| SMS INDEX | SMS INDEX | SMS DELIVER | SMS DELIVER | SMS DELIVER | SMS DELIVER |
|---|---|---|---|---|---|
| TOT. # OF MSGS =20, MSGS IN INDEX=2, INDEX MSG COUNT=1 | TOT. # OF MSGS =20, MSGS IN INDEX=2, INDEX MSG COUNT=2 | TOT. # OF MSGS =20, MESSAGE # = 1 | TOT. # OF MSGS =20, MESSAGE # = 2 | TOT. # OF MSGS =20, MESSAGE # = 3 | |

FIG.35C

MOBILE STATION AND NETWORK HAVING HIERARCHICAL INDEX FOR CELL BROADCAST SERVICE

CLAIM OF PRIORITY FROM A COPENDING PROVISIONAL PATENT APPLICATION

Priority is herewith claimed under 35 U.S.C. §119(e) from copending Provisional Patent Application 60/025,594, filed Sep. 6, 1996, entitled "Mobile Station and Network Having Hierarchical Index for Cell Broadcast Service", by M. Lietsalmi et al. The disclosure of this Provisional Patent Application is incorporated by reference herein in its entirety.

FIELD OF THE INVENTION

This invention relates generally to radiotelephones and, in particular, to radiotelephones or mobile stations such as those capable of operation with a cellular network and/or a personal communications network.

BACKGROUND OF THE INVENTION

In one presently specified air interface standard (IS-136) a Short Message Service Broadcast Channel (S-BCCH) is specified for use in sending point-to-multipoint messages to mobile stations, such as radiotelephones. A maximum number of 15 slots per Superframe may be assigned to the S-BCCH logical channel. The S-BCCH is considered as a continuous channel even if more than one slot is allocated to the S-BCCH.

The SMS frame may be defined as a sequence of 24 Superframes which are aligned with a Hyperframe (HF) counter. Thus, the number of slots assigned to the SMS frame are 0, 24, 48, 72, depending on how many slots per Superframe are assigned to BCCH.

The Hyperframe (HF) counter and a Primary Superframe (SF) indicator can be provided in the BCCH. These two counters together (2*HF Counter+Primary SF indicator) constitute a Superframe counter. A SMS frame is defined to be a single complete cycle (0–23) of the SF counter. The SMS frame is aligned to start at a HF counter value of 0, and also when the Primary Superframe indicator equals 0. The SF counter provides SMS frame synchronization information to the mobile station.

SMS subchannels are defined to allow different repetition cycles for different messages. Each subchannel has its own repetition cycle defined in terms of units of SMS frames. SMS frames are grouped into the SMS subchannels. Within each subchannel, a repetition cycle is defined (in units of SMS frames) with which the SMS broadcast message sequences contained in the SMS sub-channel are repeated. The SMS broadcast subchannel cycle may range from 1 to N SMS frames in length. Within each subchannel, the first S-BCCH slot within each SMS frame contains a header that describes the structure of the subchannel. Up to four subchannels may be defined. If more than one subchannel exists, the subchannels are time-multiplexed onto the S-BCCH channel on a SMS frame basis. If a SMS subchannel block is defined to consist of one SMS frame from each subchannel, placed in ascending order of subchannel number, then the multiplexed subchannels can be defined as the repetition of these subchannel blocks. The number of subchannels and the identity of the subchannel to which an SMS frame belongs are specified in the SMS frame header.

According to SMS header information found in the first slot in any SMS frame, the set of messages in SMS(i) may span M(i) number of SMS frames before a cycle is completed. M(i) is the length of the sub-channel cycle. The SMS frame number within the subchannel cycle is referred to as the phase of the subchannel cycle.

A number of different BCCH message categories can be defined by network operators. These include Emergency Information messages, Time and Date messages, Overload Class messages, System Identity messages, and Broadcast messages. Each BCCH message typically includes a number of fields of information. These fields can include: a Protocol Discriminator field, a Message Type field, a SMS Message ID field, and a Text Message Data field.

The Broadcast Message category field is coded to provide a number of different types of message category identifiers. These include, by example, emergency numbers and roadside information, toll gate information, airline departure/arrival information, weather-related information, news, and financial information.

There exist at least two previous proposals to enable a cell broadcast SMS operation (i.e., PN3011 (Apr. 8, 1994) and a 6/95 S-BCCH proposal). However, neither of these previous proposals provides a totally satisfactory method to manage and facilitate the access to, and use of, S-BCCH messages.

OBJECTS OF THE INVENTION

It is thus a first object of this invention to provide an improved method for providing a cell-based broadcast service.

It is another object of this invention to provide enhancements to existing or proposed S-BCCH protocols so as to facilitate the ease of use of the cell broadcast service.

It is one further object of this invention to define and provide index messages that contain information about cell broadcast messages so as to facilitate the ease of use of the cell broadcast service.

SUMMARY OF THE INVENTION

The foregoing and other problems are overcome and the objects of the invention are realized by methods and apparatus in accordance with embodiments of this invention. A method of this invention is disclosed for operating a cellular network and mobile station for transmitting and receiving, respectively, cell broadcast messages.

More particularly, this invention provides for the use of an index message in a Cell Broadcast Service. An index message is considered herein to be a special type of Cell Broadcast message which contains general information about actual broadcast messages. The index message is transmitted in a predetermined logical S-BCCH subchannel, and contains information elements such as (a) message overviews or summaries for each cell broadcast message, (b) information concerning emergency messages, (c) information concerning the language used in different broadcast messages, (d) an alphanumeric broadcast domain operator name and a specific operator greeting, (e) information concerning changes)in broadcast messages, and (f) information concerning correct subchannels. By receiving the index message, a user of the mobile station can gain access to selected ones of the cell broadcast messages.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3 through 7 provide examples of various possible S-BCCH frames;

FIG. 8 summarizes the fields comprising layer 2 protocol frames for S-BCCH operation;

FIG. 9 illustrates a SPACH Header A;

FIG. 10 illustrates the format of a Message Index S-BCCH message in accordance with this invention;

FIG. 11 illustrates the format of a Subchannel Configuration S-BCCH message;

FIG. 12 illustrates the format of a Subchannel Delimiter S-BCCH message;

FIG. 13 illustrates the format of a Subchannel Schedule S-BCCH message;

FIG. 14 illustrates the format of an R-DATA S-BCCH message;

FIG. 15 illustrates the format of a portion of a Message Type S-BCCH message;

FIG. 16 illustrates the format of a Subchannel Info information element;

FIGS. 17A and 17B illustrate a SMS Index message used to support Broadcast SMS message index delivery in accordance with an aspect of this invention;

FIGS. 18A and 18B illustrate a SMS Deliver message used to support mobile station terminated Broadcast SMS delivery in accordance with an aspect of this invention;

FIGS. 19–34B illustrate the format of various information elements employed in the SMS Index and Deliver messages of FIGS. 17A–18B; and FIGS. 35A–35C depict exemplary broadcast message sets in accordance with this invention.

DETAILED DESCRIPTION OF THE INVENTION

Figure 1:
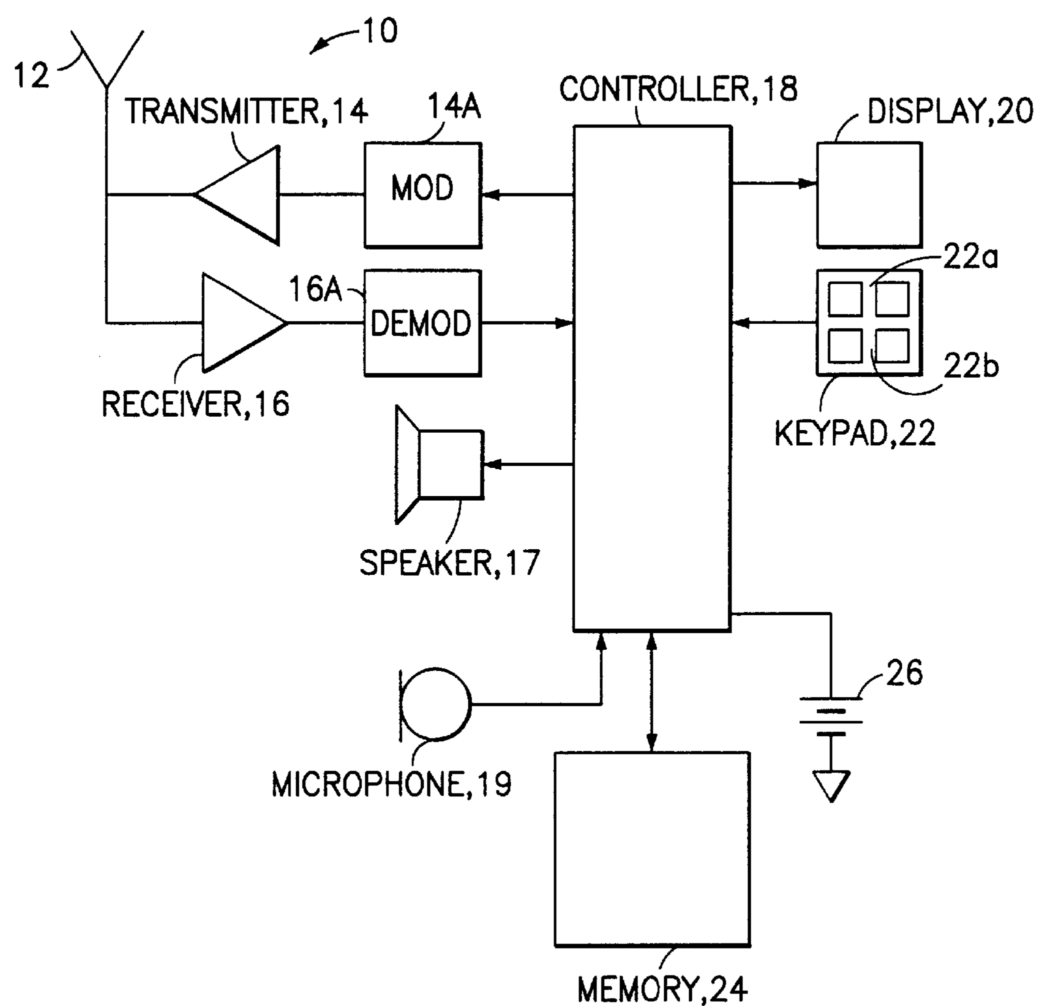
FIG. 1 is a block diagram of a mobile station that is constructed and operated in accordance with this invention.
Figure 2:
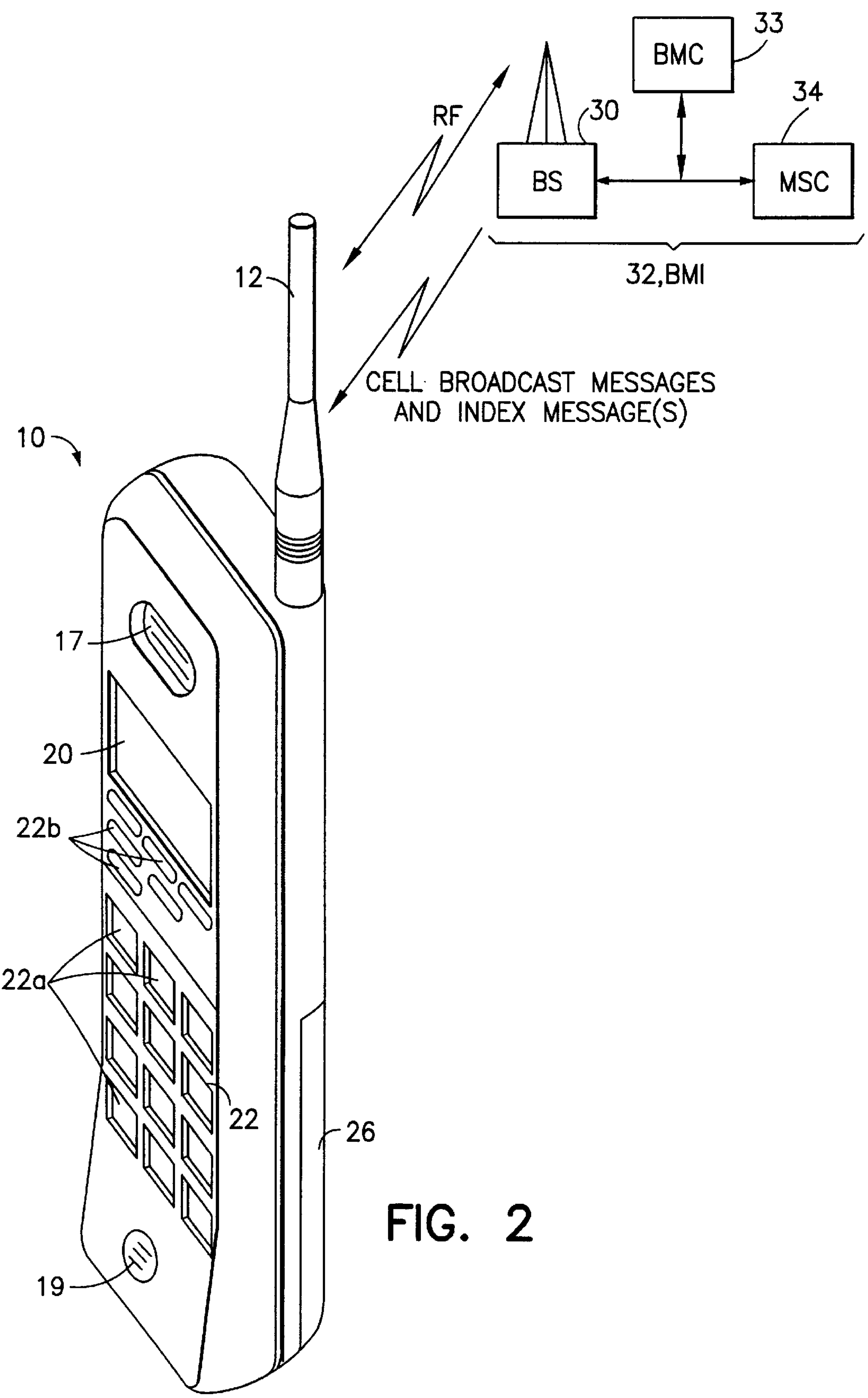
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center/Interworking function or BMI 32. The BMI 32 includes a Mobile Switching Center (MSC) 34. The MSC 34 provides a connection to landline trunks when the mobile station 10 is involved in a call. In accordance with this invention the BMI 32 includes a Broadcast Message Center (BMC) 33 that formats and transmits messages and message index information on logical subchannels of a forward digital radio channel, in accordance with the description that follows.

The mobile station 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile station, or for use only in TDMA type systems.

A user interface includes a conventional earphone or speaker 17, a conventional microphone 19, a display 20, and a user input device, typically a keypad 22, all of which are coupled to the controller 18. It is understood that the controller 18 includes the circuitry for implementing the audio and logic functions of the mobile station. The keypad 22 includes the conventional numeric (0–9) and related keys (#,*) 22*a*, and other keys 22*b* used for operating the mobile station 10. These other keys 22*b* may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including point-to-point SMS messages and cell broadcast information, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM and IS-95 (CDMA). It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the methods described below, in conjunction with a suitable controller and memory located in the BMI 32. That is, the mobile station 10 and BMI 32 cooperate to implement the improved cell broadcast service and functions described below. Incorporated by reference herein is revision 0 of IS-136 (published IS-136 integrated with the published Addendum-contribution TR45.3.6/95.05.17.07).

The Cell Broadcast service is but one of various cellular services provided by cellular network operators. With the Cell Broadcast service, short text messages can be broadcast to mobile stations, and can be received by any mobile stations within a certain area. There are different kinds of broadcast messages, and the user may be able to select which topics or message types to receive. Reference in this regard can be had to commonly assigned U.S. patent application Ser. No.: 08/499,165, filed Jul. 7, 1995, entitled "Radiotelephone User Interface for Broadcast Short Message Service", by Seppo Alanärä (one of the inventors of the subject matter of this patent application).

This invention beneficially provides for the use of an Index Message in a Cell Broadcast Service. An Index Message is considered herein to be a special type of Cell Broadcast message that contains information about actual broadcast messages being transmitted on other subchannels within a given cell associated with a base station 30 of the cellular communication system. As will be made apparent below, the Index Message contains information elements such as (a) message overviews or summaries for each cell broadcast message, (b) information concerning emergency messages, (c) information concerning the language used in different broadcast messages, (d) an alphanumeric broadcast domain operator name and a specific operator greeting, (e) information concerning changes in broadcast messages, and (f) information concerning correct subchannels.

The use of the cell broadcast-related Index Messages, in accordance with this invention, provides a number ,of advantages over the prior art methods for broadcasting messages to mobile stations. These advantages include, but are not limited to, (a) providing quick and easy access to the actual broadcast messages, (b) providing a quick and secure way to indicate emergency messages, (c) providing a possibility to support multiple languages, (d) providing an efficient way to provide information about the service provider and message originator, (e) generally facilitating the ease of use of the Cell Broadcast service for both users and service providers, and (f) increasing the speed and efficiency of user operations, thereby reducing network traffic and lowering the battery consumption of the mobile station.

This invention is thus directed primarily to the definition, structure, and use of a hierarchical index for Cell Broadcast messages.

The use of the Index Message of this invention provides at least the following new features to the air interface. First, message overviews or summaries for each layer 3 message are included in the subchannel 0 layer 3 index message to provide an efficient way for the end user to select layer 3 messages to be acquired. Second, the meaning of each message qualifier is dynamically defined, thereby enabling an essentially unlimited number of distinct meanings. Third, a distinct emergency message indication in the layer 3 index provides a mechanism to force the mobile station to acquire emergency messages and to differentiate the emergency message presentation from other messages. Fourth, the Index Messages provide multi-language support on a per subchannel basis. Such multi-language support enables separate layer 3 indexes and layer 3 messages for different languages. Fifth, the Index Messages provide support for an alphanumeric broadcast domain operator name and a specific operator greeting, and also provide support for a message originator name on a per message basis. Sixth, when there is a change in messages only the layer 3 index messages from subchannel 0 are required to be read in order to obtain an overview of the change. When a change has occurred only the layer 3 Index Messages may continue from subchannel 0 to subchannels 2 through 31. Seventh, messages that are up to 15 character long (or shorter) may be included in the layer 3 index, and thus no separate broadcast messages are required for these relatively short messages. The index number of the first message for each subchannel (subchannels 2 through 31) enables the mobile station to read the correct subchannel when a specific layer 3 message is to be acquired.

The structure of the Index Message in accordance with this invention is described in detail below.

With regard to the user interface function and implementation, multi-selection lists can be employed to select desired messages for display on the display 20. By example, the user may select the groups to be displayed (which can be a part of stored user settings), after which the user can select the specific messages to be read from the selected groups.

The S-BCCH protocol structure described below has the following attributes, features and advantages.

From 1 to 32 distinct S-BCCH subchannels may be defined where the volume of the broadcast information and the required modes of the operation (e.g. user group and/or encrypt messages) determine the total number of the subchannels supported.

The amount of bandwidth per subchannel is variable and therefore may be assigned as needed (bandwidth on demand). Each subchannel has an upper limit of 256 layer 2 frames (about 2560 octets). For 32 subchannels this translates to an upper limit of about 81.92k octets of information.

In the preferred embodiment of this invention the Subchannel 0 is dedicated to providing the following information:

- total number of subchannels activated;
- occurrence of subchannels on a per 12 Hyperframes basis;
- applicability of message encryption algorithm and key information on a per subchannel basis;
- applicability of user group operation on a per subchannel basis;
- user group IDs associated with-subchannels for which user group operation is enabled;
- applicability of data compression on a per subchannel basis;
- applicability of multi-language support on a per subchannel basis;
- layer 3 index to layer 3 messages;
- broadcast domain ID that serves to identify a logically distinct S-BCCH information set;
- subchannel change indication on a per subchannel basis; and
- the method of capture used for changes (supplemental changes either included or not included within subchannel 1) on a per subchannel basis.

The S-BCCH protocol structure also includes the following attributes.

Subchannel 1 is dedicated to providing the messages associated with subchannels 2 through 31 that have been recently changed or modified. Subchannels 2 through 31 are dedicated to carrying the full set of S-BCCH messages.

The layer 3 index message provides message qualifiers to define a unique message type—message qualifier pair for each S-BCCH message supported on subchannels 2 through 31. A total of 256 distinct message qualifiers can be defined and the meaning of each message qualifier is dynamically defined.

The use of data compression allows more and/or longer layer 3 messages on each subchannel that uses data compression. Also, search times for distinct messages are made shorter.

The ordering of subchannels is flexible to allow for a real time emphasis to be placed on information changes/additions as follows. When a cycle of subchannel 0 information is to be sent, the cycle starts in the first S-BCCH slot coincident with a hyperframe counter value of zero. Once started, subchannel 0 completes without interruption using consecutive S-BCCH slots. Subchannel 1 may be started immediately after the completion of any subchannel, or may be started by interrupting a subchannel (other than subchannel 0 or 1). Once started, subchannel 1 completes without interruption using consecutive S-BCCH slots. All remaining subchannels may be sent in any order, and are subject to interruption by subchannels 0 and 1.

Upon camping on a DCCH the mobile station 10 first reads subchannel 0 to determine if it needs to acquire S-BCCH information as follows. If the mobile station 10 determines that a new broadcast domain has been entered it proceeds to acquire new S-BCCH information, including the layer 3 index as necessary. If a new broad cast domain ha s not been entered, and the S-BCCH information has changed, the mobile station 10 proceeds to acquire new S-BCCH information, including the layer 3 index as necessary. If the mobile station 10 determines that there is a new emergency message, the mobile station 10 acquires the message and indicates same to the user.

When there is a change only the layer 3 index messages need to be read in order to obtain an overview of the change.

A mobile station 10 in the process of acquiring S-BCCH information is informed of real time changes to S-BCCH information via a change indicator at layer 2, and responds by reading subchannel 0. A mobile station 10 that has already completed the acquisition of necessary S-BCCH information is also informed of real time changes to S-BCCH information via the change indicator at layer 2, and responds by reading subchannel 0.

Each subchannel is transmitted using up to 256 layer 2 frames. This translates to about 10 maximum length (255 octet) layer 3 messages per subchannel, or, about 25 messages per subchannel assuming 100 octets per message when no data compression is used. When data compression is used this translates to about 18 maximum length (255 octet) layer 3 messages per subchannel, or about 4.0 messages per subchannel assuming 100 octets per message.

The layer 2 protocol defined in support of S-BCCH operation allows the mobile station 10 to uniquely determine the start and end of a subchannel and to begin acquiring the content of a subchannel starting with any layer 2 frame belonging to that subchannel.

Notification of a change in S-BCCH information at layer 2 is generic in that it does not indicate the affected subchannels. The mobile station 10 proceeds to read subchannel 0 to determine the specific subchannels that have been affected. This approach to S-BCCH change notification on the SPACH and S-BCCH has the following impact. First, the changed S-BCCH information may be sent beginning in the superframe immediately following the superframe in which the S-BCCH change notification is first indicated. Second, so long as the BMI 32 does not frequently change the content of the S-BCCH then all Paging Frame Class (PFC) mobile stations 10 will see and respond to the S-BCCH change notification.

R-DATA and R-Data Unit are, used to carry layer 3 information to provide usage of existing methods which are already defined for Point-to-Point Short Message Service (SMS).

A distinct emergency message indication in the layer 3 index message can force the mobile station 10 to acquire emergency messages and to differentiate the emergency message presentation from other messages.

Multi-language support in accordance with this invention enables separate layer 3 indexes and layer 3 messages for different languages.

Message summaries for each layer 3 message included in the layer 3 index message provides an efficient way for the end user to select layer 3 messages to be acquired.

If a lengthy layer 3 index is required, the layer 3 index messages may continue from subchannel 0 to subchannels 2 through 31. Furthermore, messages 15 characters long or shorter may be wholly included in the layer 3 index message and, as a result, no separate messages are needed for these short messages. This conserves radio channel bandwidth.

The index number of the first message for each subchannel (subchannels 2 through 31) enables the mobile station 10 to read the correct subchannel when a specific layer 3 message is to be acquired.

This invention furthermore supports the sending of manual acknowledgements from the mobile station 10, in a manner similar to that defined for Point-to-Point SMS, and enables, for example, over-the-air voting.

The support of a call back number function enables the operator to sell advertisement time to companies that do business via phone.

This invention also supports optional alphanumeric information concerning the system operator, for the entire broadcast domain, and also optional alphanumeric information about the originator of each layer 3 message on a per message basis enables separate broadcast domains and separate message providers to be differentiated to the end user.

Having described a number of features and advantages provided by the teaching of this invention, a more detailed description of the invention now follows.

S-BCCH

These channels provide no addressing at layer 2 and, as such, a mobile station 10 in the process of acquiring S-BCCH information accepts all layer 2 frames associated with S-BCCH subchannels it has enabled. Upon entering the DCCH Camping state (see Section 6.2.3 of IS-136.1) the mobile station 10 first enables subchannel 0. When the mobile station 10 has completed the acquisition of subchannel 0, it enables other subchannels if further information is needed and requested by layer 3. When the mobile station 10 has completed the acquisition of a full cycle of information from any given subchannel it disables that subchannel. When a complete layer 3 message is recovered from received frames, layer 2 sends a FDCCH Indication primitive to layer 3 and includes the following information: (1) a layer 3 message as defined in Section 6.4, (2) a Layer 3 Length Indicator (L3LI) providing the layer 3 message length in octets, and (3) a BCCH (S-BCCH) message indication.

S-BCCH Request

The S-BCCH Request primitive is sent from layer 3 to layer 2, and is used to carry the layer 3 messages to be sent on the S-BCCH. The S-BCCH Request primitive includes the following protocol elements: (1) a layer 3 message as defined in Section 6.4, (2) a L3LIA Layer 3 Length Indicator, providing the overall layer 3 message length in octets (one L3LI per layer 3 message); and (3) a subchannel ID to identify the subchannel that a layer 3 message is associated with.

S-BCCH Protocol

The S-BCCH layer 2 protocol is used whenever a TDMA slot is used to carry S-BCCH information. The S-BCCH protocol provides support for up to a maximum of 32 distinct S-BCCH subchannels. The set of layer 3 messages comprising a S-BCCH subchannel is sent using up to 256 S-BCCH layer 2 protocol frames. A single S-BCCH layer 2 protocol frame is constructed to fit within a 125-bit envelope (see Section 4.4.3.1 of IS-136.1). An additional 5 bits are reserved for use as tail bits, resulting in a total of 130 bits of information carried within each S-BCCH slot. The layer 2 protocol defined for S-BCCH operation supports only unacknowledged operation. FIGS. 3 through 7 provide examples of various possible S-BCCH frames. Asummary of the fields comprising layer 2 protocol frames for S-BCCH operation is provided in FIG. 8.

S-BCCH Frame Usage

BEGIN Frame

The BEGIN frame is used for starting the delivery of one or more layer 3 messages on any given subchannel of the S-BCCH. The layer 3 message that constitutes the opening message of a full cycle of S-BCCH information for any given subchannel is transmitted starting with a BEGIN frame and occupies the first L3DATA field included in the BEGIN frame. Specific rules for the placement of layer 3 message information within a BEGIN frame are as follows.

(A) If a layer 3 message fits entirely within the L3DATA field of a BEGIN frame with 9 or more bits remaining in the frame, the Begin Indicator (BI) is included immediately after the L3DATA field to indicate whether or not an additional layer 3 message is started within the frame as follows: (1) if BI=0 no other layer 3 message is started and the rest of the frame is padded with FILLER; and (2) if BI=1 a L3LI field is included immediately after the BI field. The L3LI field is then followed by another L3DATA field containing a portion of the new layer 3 message determined by the number of bits remaining in the frame.

(B) If a layer 3 message fits entirely within the L3DATA field of a BEGIN frame with from 1 to 8 bits remaining in the frame, and another layer 3 message is to be sent, BI=0 is included immediately after the L3DATA field, the rest of the frame is padded with FILLER, and the next layer 3 message is sent starting with another BEGIN frame.

(C) If a layer 3 message fits entirely within the L3DATA field of a BEGIN frame with from 1 to 8 bits remaining in the frame, and if no other layer 3 message is to be sent, BI=0 is included immediately after the L3DATA field and the rest of the frame is padded with FILLER.

(D) If a layer 3 message fits entirely within the L3DATA field of a BEGIN frame with no bits remaining, the BI field is not present and the end of the layer 3 message is implied.

(E) If a layer 3 message does not fit entirely within the L3DATA field of a BEGIN frame, it is completed using as many CONTINUE frames as necessary.

CONTINUE Frame

The CONTINUE frame is used whenever a layer 3 message cannot be completed within the previous S-BCCH layer 2 frame. The Continuation Length Indicator (CLI) field is set to indicate how many bits of the CONTINUE frame belong to the continued layer 3 message. This in turn allows for the mobile station 10 to receive a portion of a new message which may be present in a CONTINUE frame following the L3DATA field used to complete a message continued from the previous frame. Specific rules for the placement of layer 3 message information within a CONTINUE frame are as follows.

(A) If CLI indicates that the remainder of a continued layer 3 message fits entirely within the CONTINUE frame with 9 or more bits remaining in the frame, the Begin Indicator (BI) is included immediately after the L3DATA field to indicate whether or not an additional layer 3 message is started within the frame as follows: (1) if BI=0 no other layer 3 message is started and the rest of the frame is padded with FILLER; and (2) if BI=1 a L3LI field is included immediately after the BI filed. The L3LI field is then following by another L3DATA field containing a portion of the new layer 3 message. The length of the portion is determined by the number of bits remaining, in the frame.

(B) If CLI indicates that the remainder of a continued layer 3 message fits entirely within the CONTINUE frame with from 1 to 8 bits remaining in the frame, and another layer 3 message is to be sent, BI=0 is included immediately after the L3DATA field, the rest of the frame is padded with FILLER, and the next layer 3 message is sent starting with another BEGIN frame.

(C) If CLI indicates that the remainder of a continued layer 3 message fits entirely within the CONTINUE frame with from 1 to 8 bits remaining in the frame, and no other layer 3 message is to be sent, BI=0 is included immediately after the L3DATA field and the rest of the frame is padded with FILLER.

(D) If CLI indicates that the entire CONTINUE frame contains information belonging to a continued layer 3 message, the BI field is not present in the frame.

(E) A continued layer 3 message is completed using as many CONTINUE frames as necessary.

S-BCCH Subchannel Management

The S-BCCH logical channel carries SMS broadcast information using up to 32 distinct S-BCCH subchannels managed as described below.

(A) Each subchannel contains a sequence of up to 256 S-BCCH layer 2 protocol frames used to carry a subchannel specific message set. The ordering and periodicity of transmission of subchannels are variable.

(B) Subchannel 0 is sent at least once every 12*N hyperframes (N=1, 2, 3 . . . 10) and is started in the first S-BCCH slot coincident with the Hyperframe Counter value of zero (see 6.4.1.1.1.1 of IS-136.1).

(C) Subchannel 0 may be sent as often as desired as long as one instance of a full cycle of its associated information is aligned to start with the Hyperframe Counter value zero every 12*N hyperframes.

(D) Subchannel 0 starts with a Subchannel Schedule message every 12*N hyperframes (see 6.4.1.3.1.4 of IS-136.1).

(E) The hyperframe in which the S-BCCH and SPACH layer 2 SCN flags first indicate a change in S-BCCH information is immediately followed by hyperframes that reflect the new S-BCCH information.

(F) In anticipation of making the transition to updated S-BCCH information, the BMI 32 may abort the transmission of any subchannel at any point during the hyperframe immediately preceding the transition to updated S-BCCH information. The BMI 32 aborts the transmission of subchannels 0 to 1 by (re-)starting the transmission of any subchannel prior to the completion of a full cycle of S-BCCH information associated with its current subchannel. The BMI 32 aborts the transmission of subchannels 2 through 31 by (re-) starting the transmission of subchannels 2 through 31 prior to the completion of a full cycle of S-BCCH information associated with its current subchannel.

(G) The BMI 32 sends subchannels 0 and 1 without interruption using contiguous S-BCCH slots unless it aborts the transmission of these subchannels due to the transition to updated S-BCCH information. The BMI 32 also sends subchannels 2 through 31 without interruption using contiguous S-BCCH slots unless it aborts the transmission of these subchannels due to the transition to updated S-BCCH information, or unless it temporarily interrupts the transmission of its current subchannels in order to send subchannel 0 or 1 information.

(H) S-BCCH information is not be repeated in the secondary superframe.

SPACH Protocol

The SPACH layer 2 protocol is used whenever a slot is used to carry Point-to-Point SMS, Paging, or ARCH information. A single SPACH layer 2 protocol frame is constructed to fit within a 125-bit envelope (see Section 4.4.3.1). An additional 5 bits are reserved for use as tail bits resulting in a total of 130 bits of information carried within each slot assigned for SPACH purposes. FIG. 9 of this patent application and FIGS. 5–24 through 5–38 of IS-136.1 provide examples of possible SPACH headers and frames. For a complete set of SPACH layer 2 frames, see Annex C of IS-136.1. A summary of the fields comprising layer 2 protocol frames for SPACH operation is provided in Table 5-7 of IS-136.1.

S-BCCH Change Notification

S-BCCH Change Notification is controlled by the SCN flag as follows. If the S-BCCH Change Notification (SCN) flag transitions the mobile station 10 responds by reading S-BCCH information on subchannel 0. If S-BCCH information on subchannel 0 indicates that there is Message Index information also on other subchannels the mobile station 10 continues to read those subchannels which have Message Index information. If the mobile station 10 determines that S-BCCH information has changed for any subchannels of interest, or there is a new emergency message within its current SOC and Broadcast Domain, it proceeds to acquire the new S-BCCH information according to the Change Acquisition Map information element (see. 6.4.1.3.1.2) if more information is requested than what current Message Indexes include.

DCCH Camping State (D3)

Upon entering this state from the Control Channel Scanning and Locking state, or for the first time on the current DCCH as a result of control channel reselection, the mobile station 10 makes an initial reading of a full cycle of F-BCCH, E-BCCH, and subchannel 0 of S-BCCH if S-BCCH service is of interest. The mobile station 10, when in this state, does not make an access attempt until it has completed its initial reading of a full cycle of F-BCCH. After completing the initial reading of F-BCCH, the mobile station 10 leaves this state in order to process any of the transactions listed in Section 6.2.3.

BCCH Update

This procedure is invoked whenever the mobile station 10 receives a broadcast message while in the process of updating broadcast information due to a change notification, or during initial acquisition of broadcast information.

F-BCCH and E-BCCH Update

The mobile station 10 determines which of the F-BCCH and E-BCCH messages listed in Section 6.3.18.1 have been received, and invokes the Control Channel Selection, Control Channel Reselection, or Registration procedures as necessary according to changes in message content.

S-BCCH Update

The mobile station 10 determines which of the following S-BCCH messages have been received and responds as indicated.

Subchannel Schedule:

The mobile station 10 may skip the next 12*N Hyperframes (N=1,2,3 . . . 10) if none of the subchannels of interest are identified as a result of reading this message.

Subchannel Configuration:

The mobile station 10 enables all subchannels of interest identified as a result of reading this message.

Message Index:

If the mobile station 10 determines that a new Broadcast Domain has been entered for its current SOC, or that a new SOC has been entered, it proceeds to read a full cycle of S-BCCH information on all subchannels of interest.

If the mobile station 10 determines that S-BCCH information has changed for any subchannels of interest, or that a new emergency message is present within its current SOC and Broadcast Domain, it proceeds to acquire the new S-BCCH information according to the Change Acquisition Map information element (see 6.4.1.3.1.2) if more information is requested than what the current Message Indexes include.

The mobile station 10 enables all subchannels of interest identified as a result of reading the Message Index message if more information is requested than what current Message Indexes include.

R-DATA:

The mobile station 10 determines if the received message is of interest and make updates as necessary.

BCCH Messages

In addition to the already specified BCCH messages (see Section 6.4.1) several new messages are defined in accordance with this invention as follows.

The Subchannel Schedule message is sent as the first message on Subchannel 0 every 12*N Hyperframes (N=1, 2,3 . . . 10).

The Subchannel Configuration message is sent on Subchannel 0.

The Message Index message is sent on Subchannel 0 and on Subchannels 2 through 31 so that the first of these messages is always sent on Subchannel 0.

The Subchannel Delimiter message is sent on Subchannel 1.

The R-DATA message is sent on Subchannels 1 through 31.

S-BCCH Messages

The set of messages defined for S-BCCH operation is as follows.

Mandatory S-BCCH Messages

Message Index

This message is sent on S-BCCH subchannel 0 and on subchannels 2 through 31 as indicated by Subchannel Info included in the Subchannel Configuration message to indicate the nature of all R-DATA messages broadcast on the S-BCCH. The complete message index may be formed so that R-Data Units of several Message Indexes are included (see Section 8, Broadcast SMS). Also there may be several distinct complete message indexes differentiated by the Language Indicator. The Message Index has the format shown in FIG. 10.

In FIG. 10, the Message Type Indicator in the Higher Layer Protocol Data Unit is set to SMS Index. The Language Indicator information element is included in the first Message Index message of a complete message index. This information element differentiates distinct complete message indexes. The Broadcast Domain ID information element is included in the first Message Index message. The S-BCCH Change Information information element is included in the first Message Index message of a complete message index, identified by Language Indicator, when a change occurs within a group of messages of a certain language, determined by Language Indicator, and Subchannel Info is included in Subchannel Configuration. The S-BCCH Emergency Message Map information element is included in the first Message Index message when an emergency message is broadcast on the S-BCCH.

Subchannel Configuration

This message, shown in FIG. 11, is sent on S-BCCH subchannel 0 to define the format of supported subchannels.

Subchannel Delimiter

This message is sent on S-BCCH subchannel 1 to delimit groups of changed R-DATA messages associated with specific subchannels, and has the format shown in FIG. 12.

Subchannel Schedule

This message is sent as the first message on S-BCCH subchannel 0 every 12*N Hyperframes (N=1,2,3 . . . 10) to define the occurrence of subchannels, and has the format shown in FIG. 13.

R-DATA

This message is used to carry broadcast SMS layer messages (see Section 8, Broadcast SMS) and is broadcast on subchannels 1 through 31. The format of the R-DATA message is shown in FIG. 14.

The Message Type Indicator in the Higher Layer Protocol Data Unit is set to SMS Deliver. The Teleservice Server Address information element is mandatory in the event that a Manual Acknowledgement Request is provided or requested, and the Teleservice Server Address is different from the one in the mobile station 10 subscription profile. The point code and subsystem number are used in the Teleservice Server Address information element. The User Originating Address information element is mandatory in the event that the Manual Acknowledgement Request is provided or requested. The point code and subsystem number are used. The User Originating Subaddress information element may be included in the event that the Manual Acknowledgement Request is provided or requested and the User Originating Address is provided. Finally, the User Origination Address Presentation Indicator information element may be included in the event that the Manual Acknowledgement Request is provided or requested and the User Originating Address is provided. This information element is included to identify presentation restriction and screening related to the User Originating Address.

Section 6.5, Information Element Description, is modified to indicate that a change in the S-BCCH information elements triggers a transition in the SCN flag of the SPACH, and also to include a Broadcast Domain ID. This information element is used to identify a SOC-specific S-BCCH broadcast area. Adjacent DCCHs that have the same SOC, and those that send the same set of S-BCCH information use the same Broadcast Domain Identification value.

Section 6.5, Information Element Description, is also modified to include a Broadcast Mode information element to identify the broadcast mode used on a specific S-BCCH subchannel, to include a Data Compression information element that identifies a data compression algorithm in use, to include a Language information element that identifies a language, and to include the Language Indicator information element that is used to identify distinct complete message indexes differentiated by different languages.

Section 6.5, Information Element Description, is further modified to include a MEA information element to identify a Message Encryption Algorithm, and a MEK information element to identify a Message Encryption Key.

The Message Type portion of Section 6.5 is modified to include the S-BCCH Messages shown in FIG. 15.

Section 6.5 is also modified to include a Next Subchannel Schedule 12*Hyperframe Cycle information element that is used to indicate the next 12 Hyperframes cycle when the next Subchannel message is sent. Values from 1 through 10 are allowed. If the value is 1 the next Subchannel Schedule message is sent on the S-BCCH in the beginning of Subchannel 0 after 12 Hyperframes. If the value is 10 the next Subchannel Schedule message is sent on the S-BCCH in the beginning of Subchannel 0 after 120 Hyperframes (i.e., 10×12 Hyperframes).

R-Data Unit

This information element contains the Higher Layer Protocol Data Unit and is mandatory in an R-DATA message and in Message Index message.

S-BCCH Change Acquisition Map

Section 6.5 is also modified to include this information element that is used to provide change acquisition information on a per S-BCCH subchannel basis. The left most bit in this map corresponds to subchannel 31 and the right most bit corresponds to subchannel 0. Whenever there is a modification to the content of a subchannel the corresponding bit position in the map is used to inform the mobile station 10 how to acquire the new information as follows.

0=Mobile stations that have previously read the newly modified subchannel acquire the new information by reading subchannel 1. Mobile stations that are in the process of reading or have never read the newly modified subchannel acquire the new information by (re-)reading a full cycle of information from the modified subchannel.

1=Mobile stations acquire new information by reading a full cycle of information from the newly modified subchannel.

S-BCCH Change Indicator Map

This information element is used to provide change indication information on a per S-BCCH subchannel basis. The left most bit in this map corresponds to subchannel 31 and the right most bit corresponds to subchannel 0. Whenever there is a modification to the content of a subchannel the corresponding bit position in this map is toggled. Mobile stations need only proceed to acquire the new Message Index messages and/or the R-DATA for the modified subchannels that are of interest.

S-BCCH Change Information

This information element is used to carry the above-described S-BCCH Change Indicator Map and S-BCCH Change Acquisition Map.

S-BCCH Emergency Message Map

This information element is used to carry S-BCCH Emergency Message Indicator Map. The left most bit in this map corresponds to subchannel 31 and the right most bit corresponds to subchannel 0. Whenever there is a new emergency message on a subchannel the corresponding bit position in this map is toggled.

Starting Message #

This information element is used to provide the Message Number (see Section 8, Broadcast SMS) of the first R-DATA message sent on a specific S-BCCH subchannel. If the value is zero, the first message sent on the S-BCCH subchannel is a Message Index message.

Subchannel Count

This information element identifies the number of subchannels used in support of sending S-BCCH information.

Subchannel ID

This information element identifies a specific S-BCCH subchannel (0 . . . 31).

Subchannel Info

This information element identifies the attributes of supported S-BCCH subchannels, as shown in FIG. 16. With regard to the Subchannel ID information element, the S-BCCH subchannels 0 and 1 are defined implicitly and therefore need not be explicitly defined. Also, the User Group Type and ID information elements are only present if the Broadcast Mode indicates a User Group ID specific broadcast.

Subchannel Occurrence Map

This information element is used to provide occurrence information on a per S-BCCH subchannel basis for one 12 Hyperframes cycle. The left most bit in this map corresponds to subchannel 31 and the right most bit corresponds to subchannel 0. Whenever a subchannel is sent on the 12 Hyperframes cycle the corresponding bit position in this map is set as follows:

0=the subchannel is not sent on the 12 Hyperframes cycle; or

1=the subchannel is sent on the 12 Hyperframes cycle.

User Group ID

This information element identifies the User Group that the mobile station 10 has requested or has been allocated, or an S-BCCH subchannel allocated to.

User Group Type

This information element identifies the type of the User Group ID (UGID), as shown in the following Table.

| Value | Function |
|---|---|
| 00 | 20-bit Local UGID |
| 01 | 24-bit SOC UGID |
| 10 | 34-bit National UGID |
| 11 | 50-bit International UGID |

Further in accordance with the teaching of this invention IS-136.1 is modified so as to include a Broadcast Short Message Service. This aspect of the invention is now described.

Broadcast Short Message Service

The Higher Layer Protocol Data Unit field in the R-Data Unit information element is used to carry Broadcast SMS messages when the Higher Layer Protocol Identifier indicates Broadcast SMS.

The following SMS message procedures apply to SMS message transactions on the S-BCCH.

SMS Message Delivery to MS

SMS Index

This message is sent to the mobile station 10 to enable the end user to select messages to be read easily from an index. This message also carries information about the system operator. The following rules apply to an SMS INDEX.

(A) In a very small system when there are, by example, less than ten cell broadcast messages the SMS INDEX is not needed (Length Indicator in the R-Data Unit is set to zero). The SMS INDEX may be broadcast to provide information about the system (Operator Name and/or Operator Greeting) or the total number of the messages (Total # of Messages).

(B) In a small system, when there are ten to twenty cell broadcast messages, Message Summaries are broadcast without Message Type Qualifiers.

(C) In a moderate size or large system, when there are more than twenty cell broadcast messages, both Message Type Qualifiers and Message Summaries are broadcast. There may also be a need to broadcast several SMS INDEX messages for the complete message index.

(D) When Message Type Qualifiers are included the Message Summaries are mandatory.

(E) The Operator Name and Operator Greeting are provided only in the first SMS INDEX message (Index Message Count=1) when the complete message index is made of several SMS INDEX messages.

SMS Deliver

This message carries the User Data Unit, that is, the message information. The following rules apply to the mobile station 10 upon receiving an SMS DELIVER message.

(A) If the Manual Acknowledgment Request information element received in an SMS DELIVER message indicates that Manual Acknowledgment is prohibited, the mobile station 10 does not send an SMS MANUAL ACK message in response to the SMS DELIVER message.

(B) If the Manual Acknowledgment Request information element received in an SMS DELIVER message indicates that Manual Acknowledgment is provided, the mobile station 10 may send a SMS MANUAL ACK message in response to the SMS DELIVER message upon user indication (see Section 7.1.1.2.3).

(C) If the Manual Acknowledgment Request information element received in an SMS DELIVER message indicates that Manual Acknowledgment is requested, the mobile station 10 does send a SMS MANUAL ACK message in response to the SMS DELIVER message upon user indication (see Section 7.1.1.2.3).

(D) In a case when Manual Acknowledgment is either provided or requested the R-DATA which carries the SMS DELIVER message also includes the necessary address fields (see Section 6.4.1.3.2.1).

Message Set

This section describe the Broadcast SMS messages. These messages are transported on the air interface via the layer 3 Message Index and R-DATA messages, more specifically within the R-Data Unit Information Element. The following coding rules apply to this section.

(A) A Broadcast SMS message is padded with trailing zeros as necessary to the nearest octet boundary.

(B) In the interest of backwards compatibility, a received SMS message is accepted if its length exceeds the minimum length the receiving end is capable of understanding, i.e., the receiving end discards any layer 3 information it is incapable of understanding.

(C) The maximum length of a padded SMS message together with the layer 3 overhead (see Sections 6.4.3.1.1 and 6.4.4.9 and IS-136.2, Sections 2.7.3.1.3.2.19 and 3.7.3.1.3.2.23) shall not exceed 255 octets.

(D) Unless otherwise specified, a particular information element is present only once in a given message.

(E) In FIGS. 17 and 18, whether an information element is mandatory or optional in a message is identified by an "M" or "0" respectively in the column "Type" of the Figure describing a message.

(F) All of the mandatory information elements within a message are delivered to layer 3 in the order that they appear for each message.

(G) The optional information elements have a 4-bit Parameter Type code. All optional information that is included in a message is included in ascending order of the Parameter Type code, interpreted as an unsigned integer.

(H) The Parameter Type codes are message specific, and those not used are reserved.

SMS Index

This message is sent from the BMI 32 to the mobile station 10, and is used in support of Broadcast SMS message index delivery, as shown in FIG. 17A. It should be noted that there may be multiple instances of the Message Type Qualifier, Message Summary, and Emergency Message Summary information elements, and that if the Message Type Qualifier information elements exist then the corresponding Message Summary information elements must exist. FIG. 17B shows the parameter type codes for optional information elements.

SMS Deliver

This message is used in support of MS terminated Broadcast SMS delivery, and is shown in FIG. 18A. The Teleservice Server may include a single instance of the Call Back Number information element to indicate the Call Back Number associated with the message carried in the User Data Unit information element. The Teleservice Server includes one instance of the Call Back Number Presentation Indicator and Alpha Tag information elements for the instance of the Call Back Number information element being included. FIG. 18B shows the parameter type codes for optional information elements.

Information Element Description

A description of the various information elements now follows, with reference to FIGS. 19–35. In FIGS. 19–35 all specified lengths are in BITS unless otherwise noted.

Address Info

See the corresponding description referring to Section 6.5 above.

Call Back Number (FIG. 19)

This information element identifies the call back number associated with a SMS message. The maximum length of this information element is network-dependent.

Call Back Number Alpha Tag (FIG. 20)

This information element provides an alphanumeric tag specific to the associated instance of the Call Back Number information element. The information contained in this information element is coded in IRA characters.

Note 1: The minimum value is 1.

Note 2: N characters are present up to a maximum of 15 octets. The most significant bit of each octet is set to 0.

Call Back Number Presentation Indicator (FIGS. 21A–21C)

This information element identifies the presentation indication and screening specific to the associated instance of the Call Back Number information element. The Presentation Indicator field is coded as shown in FIG. 21B, while the Screening Indicator field is coded as shown in FIG. 21C.

Emergency Message Summary (FIGS. 22A and 22B)

This information element provides a short alphanumeric description about an emergency SMS DELIVER message that has the same Message # as the Emergency Message Summary information element. This information element is used as a link between a SMS INDEX and an emergency SMS DELIVER message under it. The information contained in this information element is coded in IRA characters.

Note 1: The minimum value is 0.

Note 2.: The most significant bit of each octet is set to 0. This field is ignored if the Length of Message Summary Data in octets is 0.

The Message #, the coding of which is shown in FIG. 22B, is a reference to a specific emergency SMS DELIVER message (see the Message # information element). If the value is zero, the entire message is included in the Emergency Message Summary and there is no need to read any SMS DELIVER message to retrieve the emergency message.

Index Message Count (FIG. 23)

This information element provides the index number of the current SMS INDEX message in a case when the complete message index is made of several SMS INDEX messages, e.g. if the Messages in Index is 5, the Index Message Count for the first SMS INDEX message is 1, for the second SMS INDEX message it is 2, for the third 3, for the fourth 4 and for the last one 5. If there is only one SMS INDEX message in the complete message index (that is, Messages in Index is 1) the Index Message Count is not used by the mobile station 10.

Manual Acknowledgment Request (FIG. 24)

The Manual Acknowledgment Request information element is used in the SMS DELIVER message to indicate that manual acknowledgment of the message, using a Point-to-Point SMS MANUAL ACK message, is one of prohibited, provided or requested.

Note 1: The mobile station 10 must not send a SMS Manual Ack message back.

Note 2: The mobile station 10 must send a SMS Manual Ack message back.

Note 3: The mobile station 10 may or may not send a SMS Manual Ack message back.

Message # (FIG. 25)

This information element provides the index number of the current SMS DELIVER message in a case when several SMS DELIVER messages are broadcast, e.g. if the Total # of Messages is 5, the Message # for the first SMS DELIVER message is 1, for the second SMS DELIVER message it is 2, for the third 3, for the fourth 4 and for the last one 5. If there is only one SMS DELIVER message to be broadcast (i.e. Total # of Messages if 1) the Message # is not used by the mobile station 10.

Message Provider (FIG. 26)

This information element provides alphanumeric information that is descriptive of the originator of the current SMS DELIVER message. The information contained in this information element is coded in IRA characters.

Note 1: The minimum value is 1.

Note 2: N characters are present up to a maximum of 15 octets. The most significant bit of each octet is set to 0.

Message Reference

The Message Reference gives an integer representation of a reference number of the short message. When sending a Point-to-Point SMS MANUAL ACK message the Message Reference of the original SMS DELIVER message is needed.

Messages in Index (FIG. 27)

This information element indicates how many SMS INDEX messages are broadcast, one after another, in order to compose the complete message index. If there is only one SMS INDEX message in the complete message index (that is, Messages in Index is 1) the current SMS INDEX message is the complete message index.

Message Summary (FIGS. 28A–28C)

This information element provides a short alphanumeric description of an SMS DELIVER message that has the same Message # as the Message Summary information element. This information element is used as a link between a Message Type Qualifier and the SMS Deliver messages under it. The information contained in this information element is coded in IRA characters.

Note 1: The minimum value is 0.

Note 2: The most significant bit of each octet is set to 0. This field is ignored if the Length of Message Summary Data in octets is 0.

The Message Type Qualifier ID (FIG. 28B) is a reference to a specific Message Type Qualifier information element to provide an index structure.

The Message # (FIG. 28C) is a reference to a specific SMS DELIVER message (see the Message # information element). If the value is zero, the entire message is included in the Message Summary and there is no need to read any SMS DELIVER message to retrieve the message.

Message Type Indicator (FIG. 29)

The Message Type Indicator is coded as shown in the Figure.

Message Type Oualifier (FIGS. 30A–30B)

This information element is used to identify up to 256 distinct headers to categorize SMS DELIVER messages. This information element provides a short alphanumeric description about the header and links to the Message Summary information elements that are under the header. The information contained in this information element is coded in IRA characters.

Note 1: The minimum value is 0.

Note 2: The most significant bit of each octet is set to 0. This field is ignored if the Length of Message Summary Data in octets is 0.

The Message Type Qualifier ID (FIG. 30B) is a reference to a specific Message Type Qualifier information element to provide an index structure.

Operator Greeting (FIG. 31)

This information element provides an alphanumeric greeting from the system operator. The information contained in this information element is coded in IRA characters.

Note 1: The minimum value is 1.

Note 2: The most significant bit of each octet is set to 0.

Operator Name (FIG. 32)

This information element provides an alphanumeric system operator name. The information contained in this information element is coded in IRA characters.

Note 1: The minimum value is 1.

Note 2: The most significant bit of each octet is set to 0.

Total # of Messages (FIG. 33)

This information element indicates the total number of the SMS DELIVER messages that are broadcast, excluding SMS INDEX messages.

User Data Unit (FIGS. 34A–34B)

The User Data Unit information element is used to carry the user text message. The Encoding Identifier field (FIG. 34B) indicates the encoding used in the User Data field. The User Data field represents the user message, and is encoded as specified by the Encoding identifier. If the Encoding Identifier indicates IRA, the most significant bit of each octet of User Data is set to 0.

Broadcast and Receiving Messages

FIG. 35A depicts a typical set of messages to be broadcast. In a small system (e.g., less than ten messages) the set of messages could be as shown in FIG. 35B. In a moderate size or in a large system (e.g., more than twenty messages) the set of messages could be as shown in FIG. 35C. In this latter case the complete message index is made so that the SMS INDEX messages are combined.

Exemplary message structures may be as shown in the following Tables 1–3.

TABLE 1

The first SMS Index:

| Information Element | Value |
|---|---|
| Message Type Indicator | SMS INDEX |
| Total # of Messages | 20 |
| Messages in Index | 2 |
| Index Messages Count | 1 |
| Parameter Type Qualifier ID | Message Type Qualifier |
| Message Type Qualifier Data (IRA) | 0000 0000 |
| Parameter Type | 12 |
| Message Type Qualifier ID | News Channel |
| Length of Message Type Qualifier Data in octets (N) | Message Type Qualifier |
| Message Type Qualifier ID | 0000 0001 |
| Length of Message Type Qualifier Data in octets (N) | 7 |
| Message Type Qualifier Data (IRA) | Weather |
| Parameter Type | Message Type Qualifier |
| Message Type Qualifier ID | 0000 0010 |
| Length of Message Type Qualifier Data in octets (N) | 14 |
| Message Type Qualifier Data (IRA) | Sports Results |
| Parameter Type | Message Type Qualifier |
| Message Type Qualifier ID | 0000 0011 |
| Length of Message Type Qualifier Data in octets (N) | 12 |
| Message Type Qualifier Data (IRA) | Road Reports |

TABLE 1-continued

The first SMS Index:

| | |
|---|---|
| Parameter Summary | Message Summary |
| Message Type Qualifier ID | 0000 0000 |
| Message # | 1 |
| Length of Message Summary Data in octets (N) | 14 |
| Message Summary Data (IRA) | Arms in Bosnia |
| Parameter Type | Message Summary |
| Message Type Qualifier ID | 0000 0000 |
| Message # | 2 |
| Length of Message Summary in octets (N) | 15 |
| Message Summary Data (IRA) | President Jones? |
| Parameter Type | Message Summary |
| Message Type Qualifier ID | 0000 0000 |
| Message # | 3 |
| Length of Message Summary in octets (N) | 13 |
| Message Summary Data (IRA) | Supreme Court decision |
| Parameter Type | Message Summary |
| Message Type Qualifier ID | 0000 0000 |
| Message # | 4 |
| Length of Message Summary Data in octets (N) | 15 |
| Message Summary Data (IRA) | Back to Helsinki |
| Parameter Type | Message Summary |
| Message Type Qualifier ID | 0000 0000 |
| Message # | 5 |
| Length of Message Summary Data in octets (N) | 13 |
| Message Summary Data (IRA) | Miss Universe |
| Parameter Type | Operator Name |
| Length of Operator Name Data in octets (N) | 12 |
| Operator Name Data (IRA) | Cellular Ten |
| Parameter Data | Operator Greeting |
| Length of Operator Greeting Data in octets (N) | 83 |
| Operator Greeting Data (IRA) | Thank You for using Cellular Ten Messaging System-the Most Advanced in the World! |

TABLE 2

The second SMS INDEX:

| Information Element | Value |
|---|---|
| Message Type Indicator | SMS INDEX |
| Total # of Messages | 20 |
| Messages in Index | 2 |
| Index Message Count | 2 |
| Parameter Type | Message Summary |
| Message Type Qualifier ID | 0000 0001 |
| Message # | 6 |
| Information Element | Value |
| Length of Message Summary Data in octets (N) | 15 |
| Message Summary Data (IRA) | Texas tornadoes |
| Parameter Type | Message Summary |
| Message Type Qualifier ID | 0000 0001 |
| Message # | 7 |
| Length of Message Summary Data in octets (N) | 12 |
| Message Summary Data (IRA) | Rain in West |
| Parameter Type | Message Summary |
| Message Type Qualifier ID | 0000 0001 |
| Message # | 8 |
| Length of Message Summary Data in octets (N) | 10 |
| Message Summary Data (IRA) | Snow in NY |
| Parameter Type | Message Summary |
| Message Type Qualifier ID | 0000 0001 |
| Message # | 9 |
| Length of Message Summary Data in octets (N) | 14 |

TABLE 2-continued

| The second SMS INDEX: | |
|---|---|
| Message Summary Data (IRA) | Cool in Kansas |
| Parameter Type | Message Summary |
| Message Type Qualifier ID | 0000 0001 |
| Message # | 10 |
| Length of Message Summary Data in octets (N) | 13 |
| Message Summary Data (IRA) | International |
| Parameter Type | Message Summary |
| Message Type Qualifier ID | 0000 0001 |
| Message # | 11 |
| Length of Message Summary Data in octets (N) | 11 |
| Message Summary Data (IRA) | NBA Results |
| Parameter Type | Message Summary |
| Message Type Qualifier ID | 0000 0001 |
| Message # | 12 |
| Length of Message Summary Data in octets (N) | 11 |
| Message Summary Data (IRA) | NFL Results |
| Parameter Type | Message Summary |
| Message Type Qualifier ID | 0000 0001 |
| Message # | 14 |
| Length of Message Summary Data in octets (N) | 8 |
| Message Summary Data (IRA) | NHL Results |
| Parameter Type | Message Summary |
| Message Type Qualifier ID | 0000 0001 |
| Message # | 13 |
| Length of Message Summary Data in octets (N) | 11 |
| Message Summary Data (IRA) | Indy 500 |
| Parameter Type | Message Summary |
| Message Type Qualifier ID | 0000 0001 |
| Message # | 15 |
| Length of Message Summary Data in octets (N) | 13 |
| Message Summary Data (IRA) | Track & Field |
| Parameter Type | Message Summary |
| Message Type Qualifier ID | 0000 0001 |
| Message # | 16 |
| Length of Message Summary Data in octets (N) | 15 |
| Message Summary Data (IRA) | San Diego roads |
| Parameter Type | Message Summary |
| Message Type Qualifier ID | 0000 0001 |
| Message # | 17 |
| Length of Message Summary Data in octets (N) | 8 |
| Message Summary Data (IRA) | LA roads |
| Parameter Type | Message Summary |
| Message Type Qualifier ID | 0000 0001 |
| Message # | 18 |
| Length of Message Summary Data in octets (N) | 13 |
| Message Summary Data (IRA) | San Francisco |
| Parameter Type | Message Summary |
| Message Type Qualifier ID | 0000 0001 |
| Message # | 19 |
| Length of Message Summary Data in octets (N) | 14 |
| Message Summary Data (IRA) | Portland roads |
| Parameter Type | Message Summary |
| Message Type Qualifier ID | 0000 0001 |
| Message # | 20 |
| Length of Message Summary Data in octets (N) | 13 |
| Message Summary Data (IRA) | Seattle roads |

TABLE 3

| The first SMS DELIVER: | |
|---|---|
| Information Element | Value |
| Message Type Indicator | SMS DELIVER |
| Message Reference | 0 0000 0110 0010 |
| Total # of Messages | 20 |
| Message # | 1 |
| Manual Acknowledge Request (Note 1) | Manual Acknowledgment Provided |
| Length Indicator in octets (N) | 173 |
| Encoding Identifier | IRA |
| Reserved | 000 |
| User Data | International UN troops have arrived in Bosnia to secure peace. You may give us your opinion:<br>Press 1 = you think they will succeed.<br>Press 2 = you do not think so. |
| Parameter Type | Message Provider |
| Length of Message Provider Data in octets (N) | 8 |
| Message Provider Data (IRA) | CellNews |
| Parameter Type | Call Back Number |
| Length of Address Info content in octets (N) | 6 |
| Type of Number | Unknown |
| Numbering Plan Identification | Unknown |
| Address Encoding | TBCD |
| Address | 1 987 654 3210 |
| Parameter Type | Call Back Number Alpha Tag |
| Length of Call Back Number Alpha Tag Data in octets (N) | 12 |
| Call Back Number Alpha Tag Data (IRA) | News Hotline |

Note 1: Teleservice Server Address and User Originating Address must exist in the R-DATA.

Although described in the context of preferred embodiments, it should be realized that a number of modifications to these teachings may occur to one skilled in the art. Furthermore, and as was stated earlier, the teaching of this invention should not be construed to be limited for use with any one particular air interface, such as IS-136. Thus, while the invention has been particularly shown and described with respect to preferred embodiments thereof, it will be understood by those skilled in the art that changes in form and details may be made therein without departing from the scope and spirit of the invention.

What is claimed is:

1. A method for providing and using a cell broadcast service in a cellular communications network, comprising the steps of:

providing a digital transmission channel from a BMI to a plurality of mobile stations, the channel being logically partitioned into a plurality of subchannels;

broadcasting a plurality of different types of messages on a plurality of the subchannels while broadcasting indexing information for the messages on a first predetermined other one of the subchannels, the indexing information comprising at least one message summary portion that is descriptive of an informational content of at least one of the messages; and receiving the indexing information with a mobile station and using the indexing information to acquire at least one of the messages from one of the plurality of subchannels.

2. A method as in claim 1, wherein at least a portion of the indexing information indicates the occurrence of subchannels on an N Hyperframe basis, wherein N is equal to 12.

3. A method as in claim 1, wherein at least a portion of the indexing information indicates, on a subchannel basis, a language supported by the subchannel.

4. A method as in claim 1, wherein at least a portion of the indexing information indicates an emergency message.

5. A method as in claim 1, wherein at least a portion of a message indicates that a response is required from a user of a mobile station.

6. A method as in claim 1, wherein at least a portion of a message indicates a call back number.

7. A method as in claim 1, wherein the indexing information is comprised of one index message.

8. A method as in claim 1, wherein at least a portion of a message indicates an originator of the message.

9. A method as in claim 1, wherein at least a portion of the indexing information indicates a subchannel configuration, a subchannel delimiter, and a subchannel schedule.

10. A method as in claim 1, wherein at least a portion of the indexing information indicates a subchannel map, wherein an $n^{th}$ bit of the map is toggled to indicate that information conveyed by a corresponding $n^{th}$ subchannel has changed.

11. A method for providing and using a cell broadcast service in a cellular communications network, comprising the steps of:

providing a digital transmission channel from a BMI to a plurality of mobile stations, the channel being logically partitioned into a plurality of subchannels;

broadcastincr a plurality of different types of messages on a plurality of the subchannels while broadcasting indexing information for the messages on a first predetermined other one of the subchannels; and receiving the indexing information with a mobile station and using the indexing information to acquire at least one of the messages from one of the plurality of subchannels, wherein the indexing information is comprised of a plurality of index messages, and wherein the indexing information includes an index message count.

12. A digital cellular telecommunications system comprising a BMI having at least one base station for transmitting information to a plurality of mobile stations, said system comprising:

at least one digital transmission channel that is logically partitioned into a plurality of subchannels;

a BMI controller for broadcasting a pluratity of different types of messages on a plurality of the subchannels while broadcasting indexing information for the messages on at least one predetermined other one of the subcahannels, the indexing information comprising at least one message summary portion that is descriptive of an informational content of at least one of the messages; and a mobile station controller for receiving the indexing information and for using the indexing information to acquire at least one of the messages from one of the plurality of subchannels.

13. A system as in claim 12, wherein at least a portion of the indexing information indicates the occurrence of subchannels on an N Hyperframe basis, wherein N is equal to 12.

14. A system as in claim 12, wherein at least a portion of the indexing information indicates, on a subchannel basis, a language supported by the subchannel.

15. A system as in claim 12, wherein at least a portion of the indexing information indicates an emergency message.

16. A system as in claim 12, wherein at least a portion of a message indicates that a response is required from a user of a mobile station.

17. A system as in claim 12, wherein at least a portion of a message indicates a call back number.

18. A system as in claim 12, wherein the indexing information is comprised of one index message.

19. A system as in claim 12, wherein at least a portion of a message indicates an originator of the message.

20. A system as in claim 12, wherein at least a portion of the indexing information indicates a subchannel configuration, a subchannel delimiter, and a subchannel schedule.

21. A system as in claim 12, wherein at least a portion of the indexing information indicates a subchannel map, wherein an $n^{th}$ bit of the map is toggled to indicate that information conveyed by a corresponding $n^{th}$ subchannel has changed.

22. A digital cellular telecommunications system comprising a BMT having at least one base station for transmitting information to a plurality of mobile stations, said system comprising:

at least one digital transmission channel that is logically partitioned into a plurality of subchannels;

a controller for broadcasting a plurality of different types of messages on a plurality of the subchannels while broadcasting indexing information for the messages on at least one predetermined other one of the subchannels; and means in each of said mobile stations for receiving the indexing information and for using the indexing information to acquire at least one of the messages from one of the plurality of subchannels, wherein the indexing information is comprised of a plurality of index messages, and wherein the indexing information includes an index message count.

23. A method for broadcasting messages in a cellular communications network having forward channels organized as frames and hyperframes, comprising the steps of:

partitioning a forward digital transmission channel into n subchannels;

broadcasting a plurality of different types of messages on a plurality of the n subchannels while broadcasting indexing information for the messages on a first predetermined other one of the subchannels; and receiving the indexing information with a mobile station and using the indexing information to acquire at least one of the messages from one of the plurality of subchannels, wherein the indexing information is transmitted on a subchannel 0, wherein a cycle of subchannel 0 information begins coincident with a hyperframe counter value of zero; wherein a subchannel 1 provide messages associated with subchannels 2 through n that have been recently changed or modified, wherein subchannel 1 is started at a completion of any subchannel, or is started by interrupting a subchannel (other than subchannel 0 or 1; and wherein all remaining 2-n subchannels may be sent in any order, and are subject to interruption by subchannels 0 and 1.

* * * * *

UNITED STATES PATENT AND TRADEMARK OFFICE

CERTIFICATE OF CORRECTION

PATENT NO. : 6,201,974 B1
DATED : March 13, 2001
INVENTOR(S) : Mikko Lietsalmi, Jaakko Vanttila and Seppo Alanara It is certified that error appears in the above-identified patent and that said Letters Patent is hereby corrected as shown below:

Claim 11,
Line 26, delete "broadcastincr" and insert -- broadcasting --

Claim 12,
Line 48, delete "subcahannels" and insert -- subchannels --

Claim 22,
Line 20, delete "BMT" and insert --BMI --

Signed and Sealed this

Fourth Day of September, 2001

*Attest:*

NICHOLAS P. GODICI

*Attesting Officer* *Acting Director of the United States Patent and Trademark Office*